United States Patent
Kumar et al.

(10) Patent No.: US 12,289,262 B2
(45) Date of Patent: Apr. 29, 2025

(54) PT-RS CONFIGURATION IN SEMI-PERSISTENT OR AGGREGATED MODE OF TRANSMISSION FOR INCREASED THROUGHPUT AND RELIABILITY

(71) Applicant: QUALCOMM Incorporated, San Diego, CA (US)

(72) Inventors: Satish Kumar, Hyderabad (IN); Sarath Pinayour Chandrasekaran, Hyderabad (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 17/457,636

(22) Filed: Dec. 3, 2021

(65) Prior Publication Data

US 2023/0179351 A1  Jun. 8, 2023

(51) Int. Cl.
*H04L 5/00* (2006.01)
*H04W 72/044* (2023.01)

(52) U.S. Cl.
CPC ......... *H04L 5/0048* (2013.01); *H04W 72/044* (2013.01)

(58) Field of Classification Search
CPC .................. H04L 5/0048; H04W 72/044
See application file for complete search history.

(56) References Cited

U.S. PATENT DOCUMENTS

| | | | |
|---|---|---|---|
| 2020/0153586 A1* | 5/2020 | Bai | H04W 72/12 |
| 2020/0403748 A1* | 12/2020 | Yokomakura | H04L 5/0048 |
| 2022/0060215 A1* | 2/2022 | Nakamura | H04W 72/21 |
| 2023/0291523 A1* | 9/2023 | Hasegawa | H04L 5/0094 |
| 2024/0063972 A1* | 2/2024 | Echigo | H04L 5/0051 |

FOREIGN PATENT DOCUMENTS

CN  112134661 A  * 12/2020  ........... H04L 1/0003

* cited by examiner

*Primary Examiner* — Brian P Cox
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for PT-RS configurations in persistent, semi-persistent, and aggregated modes of transmission. A first wireless device may be configured to communicate with a second wireless device based on a configuration in which one or more reception slots follow a transmission period or a gap period. The first wireless device may receive, from the second wireless device, communication in the one or more reception slots following the transmission period or the gap period with a reference signal configuration that is different than at least one additional reception slot.

29 Claims, 12 Drawing Sheets

PT-RS CONFIGURATION IN SEMI-PERSISTENT OR AGGREGATED MODE OF TRANSMISSION FOR INCREASED THROUGHPUT AND RELIABILITY

TECHNICAL FIELD

The present disclosure relates generally to communication systems, and more particularly, to wireless communication including a phase tracking reference signal (PT-RS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be associated with a first wireless device and configured to communicate with a second wireless device based on a configuration in which one or more reception slots follow a transmission period or a gap period; and receive, from the second wireless device, communication in the one or more reception slots following the transmission period or the gap period with a reference signal (RS) configuration that is different than at least one additional reception slot.

In another aspect of the disclosure, a method, a computer-readable medium, and an apparatus are provided. The apparatus may be associated with a second wireless device and configured to communicate with a first wireless device based on a configuration in which one or more transmission slots follow a reception period or a gap period; and transmit, to the first wireless device, communication in the one or more transmission slots following the reception period or the gap period with a RS configuration that is different than at least one additional transmission slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
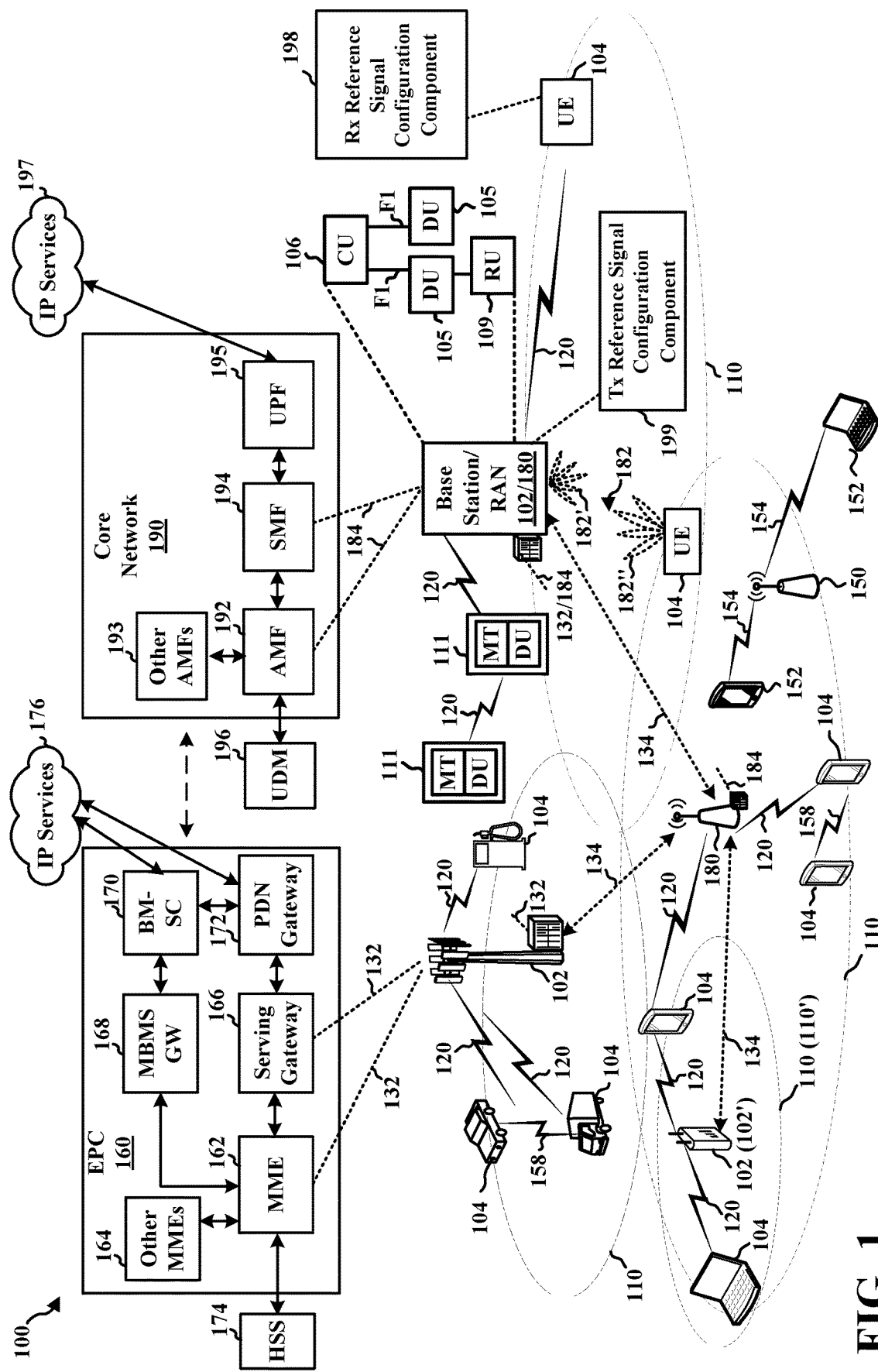
FIG. 1 is a diagram illustrating an example of a wireless communications system and an access network.

A first downlink slot that follows a discontinuity in a time division duplex (TDD) slot configuration may be associated with a block error rate (BLER). The discontinuity may correspond to a user equipment (UE) switching from a transmit (Tx) beam in an uplink slot of the TDD slot configuration to a receive (Rx) beam in the first downlink slot of the TDD slot configuration that follows the uplink slot. In examples, a phase tracking reference signal (PT-RS) may be enabled for all of the downlink slots and special slots of the TDD slot configuration to improve phase estimation and reduce the BLER. However, as the BLER in the first downlink slot is based on the discontinuity, the subsequent downlink slots of the TDD slot configuration may not include the BLER and may, therefore, not receive an improvement from having the PT-RS enabled in such slots. While enabling the PT-RS may improve reliability with respect to the first downlink slot, enabling the PT-RS in every slot of the TDD slot configuration may unnecessarily lower the data rate in cases where the UE is able to decode the information/data using a demodulation reference signal (DMRS) (e.g., without the PT-RS being enabled). Accordingly, enabling the PT-RS on a slot-specific basis may provide a balance between the data rate and the reliability. For example, the PT-RS may be enabled at only the first downlink slot that follows the discontinuity, enabled based on a periodicity, and/or enabled with different densities in different slots based on the BLER associated with the different slots.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range (FR) designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an Rx reference signal configuration component 198 configured to communicate with a second wireless device based on a configuration in which one or more reception slots follow a transmission period or a gap period; and receive, from the second wireless device, communication in the one or more reception slots following the transmission period or the gap period with a reference signal (RS) configuration that is different than at least one additional reception slot. In certain aspects, the base station 180 may include a Tx reference signal configuration component 199 configured to communicate with a first wireless device based on a configuration in which one or more transmission slots follow a reception period or a gap period; and transmit, to the first wireless device, communication in the one or more transmission slots following the reception period or the gap period with a RS configuration that is different than at least one additional transmission slot. Although the following description may be focused on 5G NR, the concepts described herein may be applicable to other similar areas, such as LTE, LTE-A, CDMA, GSM, and other wireless technologies.

Figure 2:
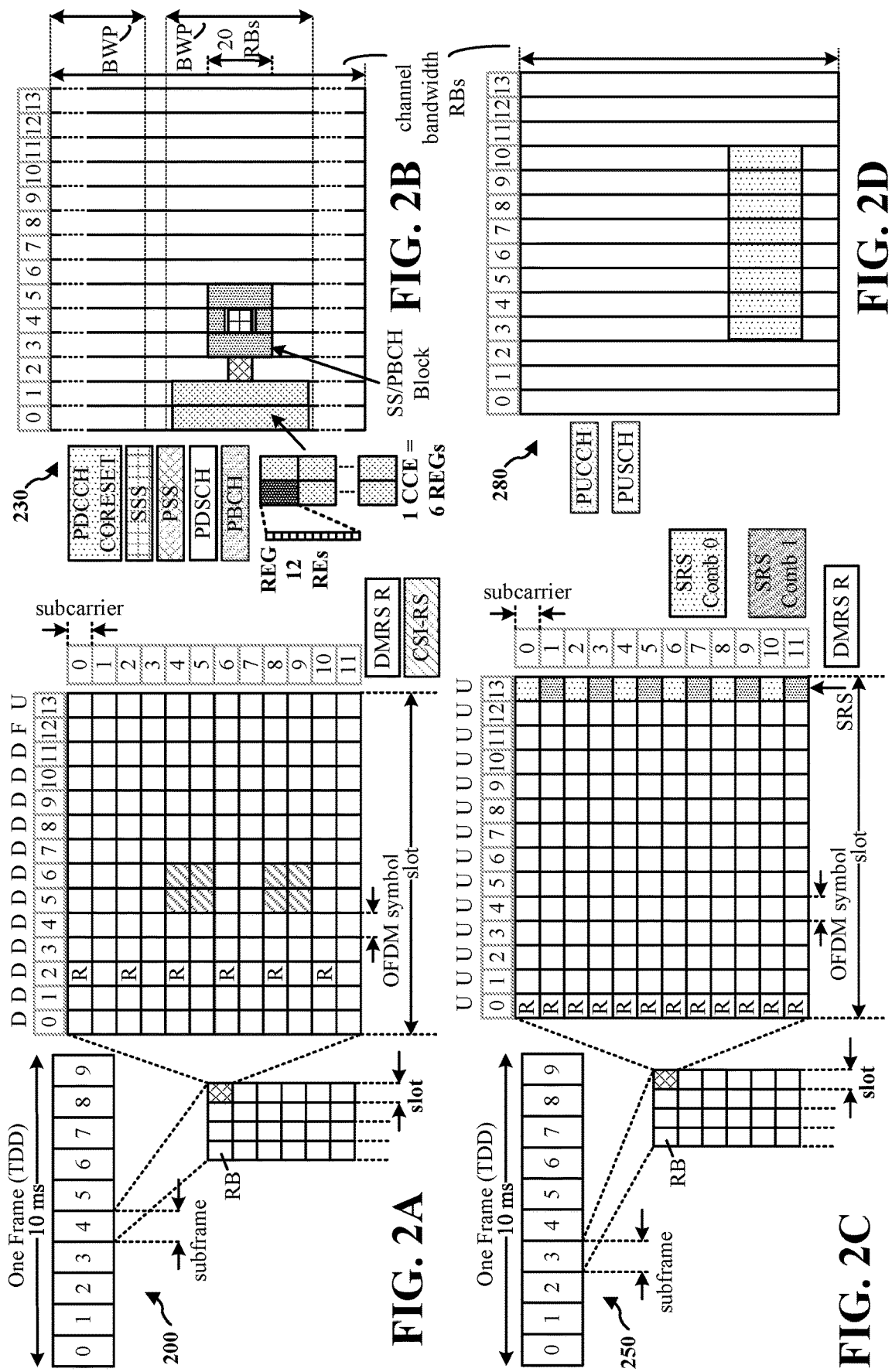
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot (dynamically through DL control information (DCI), or semi-format statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
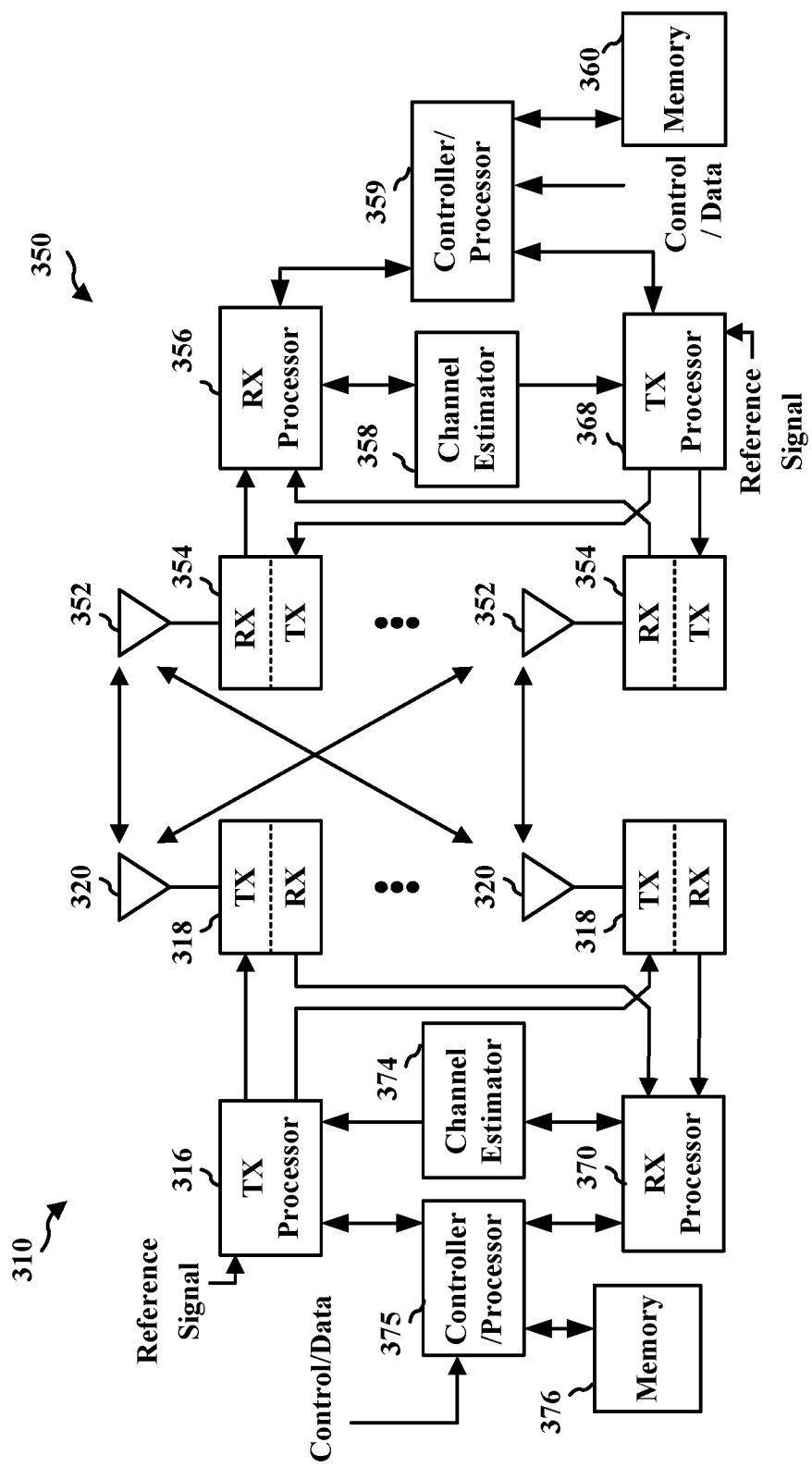
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the Rx reference signal configuration component 198 of FIG. 1.

At least one of the TX processor 316, the RX processor 370, and the controller/processor 375 may be configured to perform aspects in connection with the Tx reference signal configuration component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
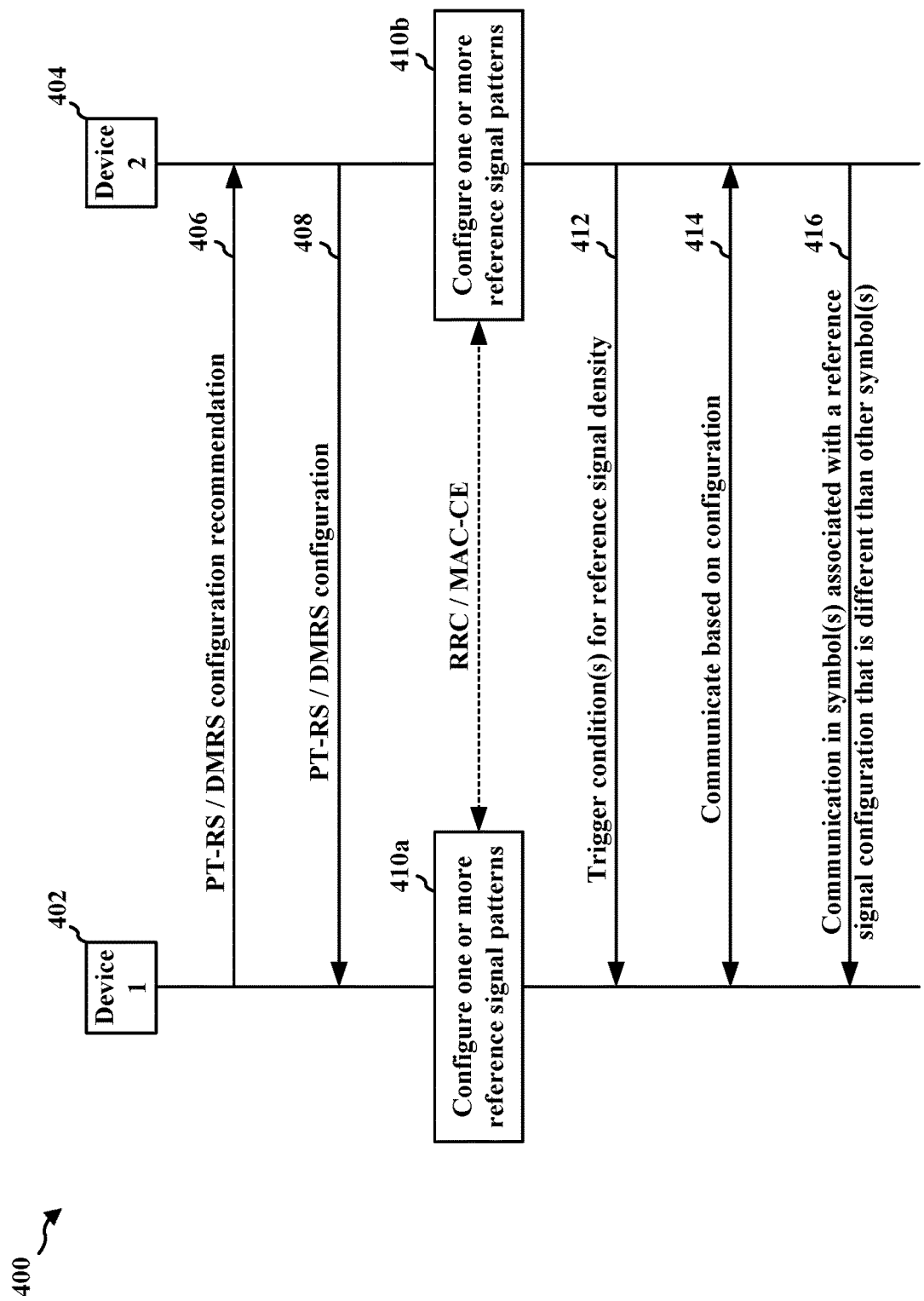
FIG. 4 is a call flow diagram illustrating communications between a first wireless device and a second wireless device.

FIG. 4 is a call flow diagram 400 illustrating communications between a first wireless device 402 and a second wireless device 404. In a first example, the first wireless device may be a UE and the second wireless device may be a base station. In a second example, the first wireless device may be a base station and the second wireless device may be a UE.

At 406, the first wireless device may transmit a PT-RS configuration recommendation and/or a DMRS configuration recommendation to the second wireless device 404. The configuration recommendation(s) may be indicative of slots in a TDD slot configuration pattern that include the PT-RS and/or the DMRS. At 408, the second wireless device 404 may transmit a PT-RS configuration and/or a DMRS configuration to the first wireless device 402, which may be based on the configuration recommendation(s) communicated, at 406.

At 410a, the first wireless device 402 may configure one or more reference signal patterns based on a reference signal configuration communicated, at 408. At 410b, the second wireless device 404 may similarly configure the one or more reference signal patterns based on the reference signal configuration communicated, at 408. The reference signal patterns may correspond to a PT-RS pattern in a TDD configuration and/or to a DMRS pattern in the TDD configuration. The one or more reference signal patterns may be configured via radio resource control (RRC) signaling or a medium access control-control element (MAC-CE).

At 412, the second wireless device 404 may indicate trigger condition(s) for reference signal density to the first wireless device 402. For example, based on the trigger condition(s), a reference signal included in a first number of symbols/slots may have a higher or lower density than a reference signal included in a second number of symbols/slots. The trigger conditions may include one or more of a frequency range, a frequency band, a subcarrier spacing, a modulation and coding scheme (MCS), a frequency domain RB, or a time domain symbol allocation.

At 414, the first wireless device 402 and the second wireless device 404 may communicate with each other based on a configuration of symbols/slots associated with the one or more reference signal patterns configured, at 410a-410b. The configuration of the symbols/slots may include one or more downlink symbols that follow a gap period and/or an uplink period. At 416, the first wireless device 402 and the second wireless device 404 may communicate in symbol(s) associated with the reference signal configuration indicated, at 408, where the reference signal configuration is different from a configuration of other symbol(s)/slot(s) in the reference signal pattern.

Figure 5:
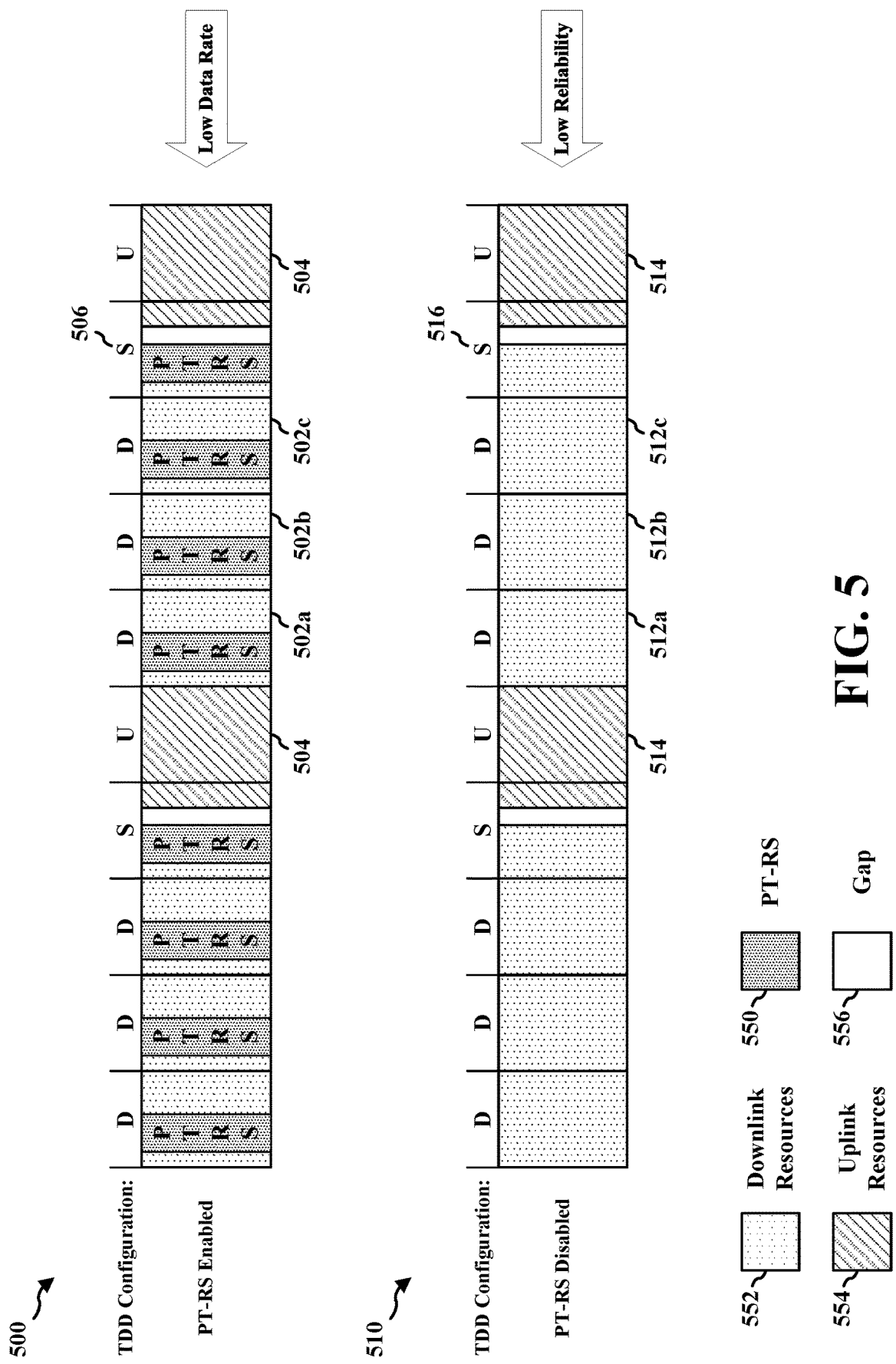
FIG. 5 illustrates time domain duplex (TDD) slot configuration diagrams associated with enabled/disable phase tracking reference signals (PT-RSs).

FIG. 5 illustrates TDD slot configuration diagrams 500/510 associated with enabled/disable PT-RS 550. PT-RS configurations may correspond to persistent, semi-persistent, and aggregated modes of transmission, which may provide increased throughput and reliability. Devices at the base station, such as mmW devices, may be configured based on different frequencies. For example, a first base station that operates in FR2 may include a first device configured for 28 GHz and a second base station that operates in FR2 may include a second device configured for 39 GHz. In some cases, serving UEs associated with the base station may experience an increase in a block error rate (BLER) as a frequency of a communicated signal is increased. For example, a serving UE may not be able to properly decode a PDSCH in downlink for certain slots of a TDD slot configuration.

The TDD slot configuration diagrams 500/510 correspond to a TDD configuration of DDDSU, where D refers to a downlink slot, U refers to an uplink slot, and S refers to a special slot that may include one or more of downlink resources 552, uplink resources 554, PT-RS 550, and gap symbols 556. An S slot 506/516 may be configured, for example, to include 10 downlink symbols, 2 special symbols/guard symbols, and 2 uplink symbols. The D slots 502a-502c/512a-512c may have a PDCCH allocation in symbol 1 and a PDSCH allocation in symbol 2 to symbol 13. The S slot 506/516 (e.g., with 10 downlink symbols) may have a PDCCH allocation in symbol 1 and a PDSCH allocation in symbol 2 to symbol 9. The S slot 506/516 may also include PUCCH for HARQ feedback. The U slot 504/514 may have a PUSCH allocation corresponding to uplink data and a PUCCH for HARQ feedback.

An MCS table used for downlink communications may correspond to a Table-0, which may be based on MCS 27 in some examples. The Table-0 may be a 64 quadrature amplitude modulation (QAM) table. UE decoding errors (e.g., at increased frequencies) may also be associated with DMRS TypeA position 2, where a second symbol includes DMRS, and DMRS additional positions Pos1, where DMRS is included at one more additional symbols of the 13 allocated symbols. Such UE decoding errors may occur when the PT-RS 550 is disabled for a TDD slot configuration, as illustrated in the TDD slot configuration diagram 510.

As frequency increases, PT-RS 550 may be utilized more often to estimate the phase due to phase distortion/phase noise associated with the increased frequencies. Thus, a lack of PT-RS 550 at higher frequencies may decrease an accuracy of the decoding procedures. Even a slightly incorrect estimation of the phase at higher frequencies may cause a decoding error for the symbols or samples at an output of an FFT operation, as a sample duration at a higher subcarrier spacing may be decreased. A smaller sample duration may increase a probability of a decoding error based on errors in the phase estimation.

A TDD slot configuration of DDDSU includes a 5-slot periodicity and may be used for single-user configurations. In some examples, decoding errors may be observed at a first D slot 512a that immediately follows a U slot 514 or a discontinuity in the TDD slot configuration when the PT-RS 550 is disabled. That is, the first D slot 512a after the U slot 514/discontinuity in the periodicity associated with the TDD slot configuration DDDSU may include a BLER. For example, the first D slot 512a may have a 1-2% BLER when the PT-RS 550 is disabled, while other slots (e.g., 512b, 512c, and 516) in the TDD slot configuration diagram 510 may have no BLER. Configurations associated with a high MCS may also be improved based on increased occurrences of the PT-RS 550, as higher MCS symbols in a constellation diagram may be more congested. Even slight errors in the decoding may cause a BLER at a higher MCS.

An impact of disabling the PT-RS 550 may be observed when moving from a 28 GHz device to a 39 GHz device (e.g., based on 64 QAM). For a same MCS, such as MCS 27, a 39 GHz device that operates without PT-RS 550 may include the BLER of 1-2% in the first D slot 512a that follows the U slot 514/discontinuity in the TDD slot configuration diagram 510, but a 28 GHz device that operates without the PT-RS 550 may not observe any BLER. Discontinuity that occurs when the UE switches from Tx operations to Rx operations (e.g., transitions from the U slot 504/514 to the first D slot 502a/512a or other slots 502b-502c, 512b-512c, 506, 516 in the TDD configuration) may cause the phase estimation to be inaccurate. For example, the UE may switch a Tx/Rx chain from transmitting data to the base station in the U slot 504/514 to receiving PDCCH/PDSCH information in the first D slot 502a/512a that follows the discontinuity/U slot 504/514. The discontinuity associated with the switch may cause the UE to lose track of the phase. Further, phase estimation based on DMRS may not have sufficient reliability for avoiding a threshold level of BLER.

In the above example, the impact of the discontinuity may be negligible for the 28 GHz device, while the same discontinuity may cause 1-2% BLER in the 5-slot periodicity for the 39 GHz device operating based on MCS 27. A lower MCS (e.g., MCS≤20) for the 39 GHz device may allow the device to successfully decode the information included in the first D slot 502a/512a that follows the discontinuity/U slot 504/514 for 64 QAM operations. The coding rate may be reduced as the MCS is decreased. Thus, the phase estimation for the first D slot 502a/512a that follows the discontinuity/U slot 504/514 may be performed based on DMRS for MCS≤20, but at a higher MCS, decoding based on the DMRS may be associated with a BLER.

MCS Table-2, which includes a higher MCS index and corresponds to 256QAM, may be associated with similar BLER observations for the 28 Ghz device. Thus, moving from 64 QAM to 256 QAM may cause the BLER at 28 GHz (in addition to 39 GHz) if the PT-RS 550 is disabled, as illustrated in the TDD slot configuration diagram 510. Transitioning from lower frequency range operations to higher frequency range operations may be improved by enabling the PT-RS 550, as illustrated in the TDD slot configuration diagram 500, which may reduce an impact of phase discontinuity on the decoding operations. Similarly, transitioning from lower MCS operations to higher MCS operations may be improved by enabling the PT-RS 550.

In the TDD slot configuration diagram 500, the TTD configuration corresponds to the PT-RS 550 being enabled and, in the TDD slot configuration diagram 510, the TDD configuration corresponds to the PT-RS 550 being disabled. The first D slot 512a that follows the discontinuity/U slot 514 in the TDD slot configuration diagram 510 may have a 1-2% BLER. A second D slot (e.g., 512b) and a third D slot (e.g., 512c) that follow the discontinuity/U slot 514 in the TDD slot configuration diagram 510 may have no BLER. Similarly, the S slot 516 may have no BLER. The UE may transmit a PUSCH in the U slot 514 and subsequently receive information in the first D slot 512a of the TDD configuration based on a periodicity of the TDD configuration. As a result of discontinuity that occurs from switching between Tx operations associated with the U slot 514 and Rx operations associated with the first D slot 512a, the UE may experience the BLER in the first D slot 512a after the U slot 514. In the TDD slot configuration diagram 500, where the PT-RS 550 is enabled in all of the D slots (e.g., 502a, 502b, 502c) and the S slot 506, the UE may not experience a BLER in any of the slots associated with the TDD configuration. Thus, after the discontinuity, the PT-RS 550 may provide improved phase estimations, which may improve a reliability of decoding procedures. However, techniques associated with the TDD slot configuration diagram 500 may be associated with a low data rate.

In the TDD slot configuration diagram 510, where the PT-RS 550 is disabled, the data rate may be increased. However, disabling the PT-RS 550 across all of the slots in the TDD slot configuration diagram 510 may provide a low reliability. The data rate may be lowered in the TDD slot configuration diagram 500 based on using certain REs in each slot for allocating the PT-RS 550. In examples, the first D slot 512a after the discontinuity may be associated with the BLER and subsequent slots (e.g., 512b, 512c, 516) in the TDD configuration may not include the BLER. Thus, including the PT-RS 550 in each subsequent slot that follows the first D slot 502a may unnecessarily lower the data rate, as the UE may be able to decode the information/data in such slots based on DMRS (e.g., without the PT-RS 550 being included in such slots). Enabling the PT-RS 550 based on slot-specific techniques may provide a balance between the data rate and the reliability.

Figure 6:
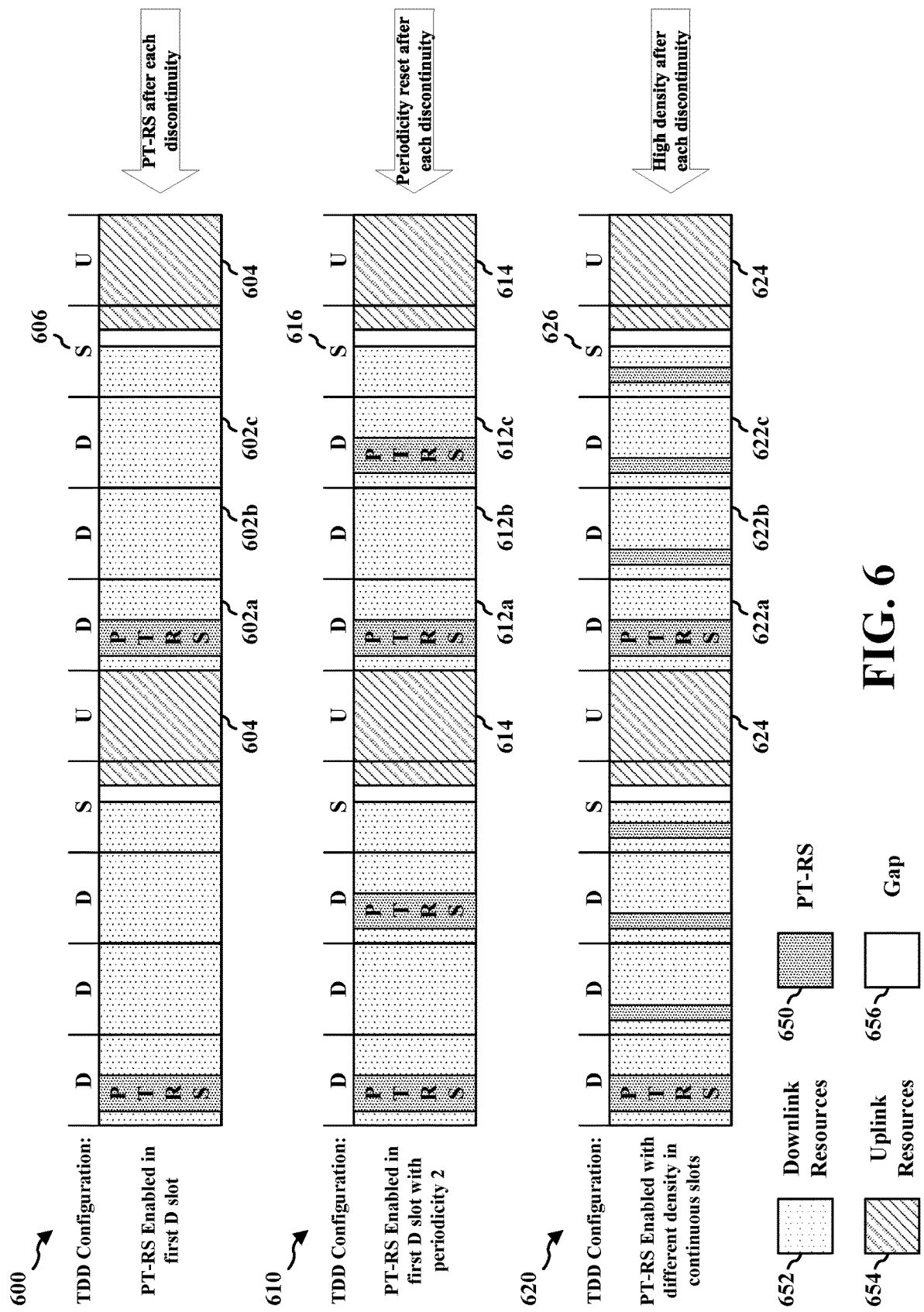
FIG. 6 illustrates TDD slot configuration diagrams associated with slot-specific PT-RS configurations.

FIG. 6 illustrates TDD slot configuration diagrams 600, 610, and 620 associated with slot-specific PT-RS configurations. Decoding procedures may be impacted based on an absence of PT-RS 650 in a first D slot 602a/612a/622a that follows a U slot 604/614/624 based on the UE observing a discontinuity caused by switching from a Tx beam to an Rx beam. Thus, for persistent/semi-persistent scheduling or aggregated scheduling, where the UE may not transmit HARQ-ACK in uplink resources 654 until a downlink reception in downlink resources 652 is complete, the UE may be able to decode the information included in some slots without PT-RS 650 or with a low PT-RS density. In aggregated modes of scheduling, a first slot and a last slot in the TDD configuration may include DMRS. The UE may perform inferencing procedures to estimate the phase between the DMRS of the first slot and the DMRS of the last slot to decode the data associated with the slots. Based on persistent/semi-persistent scheduling, the UE may determine when the data is going to be received by the UE and when a discontinuity is going to occur. For example, the data may be received in the first D slot 602a/612a/622a that follows the U slot 604/614/624 based on the persistent, semi-persistent, or aggregation modes of scheduling.

In the TDD slot configuration diagram 600, the PT-RS 650 may be enabled with high density in the first D slot 602a that follows a discontinuity/U slot 604 for each repetition of the TDD configuration (e.g., to account for the BLER). As a BLER of 1-2% may not be too significant in some cases, lower density PT-RS may be utilized in the first D slot 602a of the TDD configuration in some instances, rather than higher density PT-RS. However, if the first D slot 602a has a BLER of 10%, a second D slot (e.g., 602b) has a BLER of 2%, and a third D slot (e.g., 602c) has no BLER, the high density PT-RS may be utilized for the first D slot 602a of the TDD configuration, a different/lower density of PT-RS 650 may be utilized for the second D slot (e.g., 602b) of the TDD configuration, etc. That is, a higher density of PT-RS 650 may be used to account for the 10% BLER in the first D slot 602a, and a lower density of PT-RS 650 may be used to account for the 2% BLER in the second D slot (e.g., 602b).

The UE may be configured to identify a discontinuity when the UE is scheduled, or the UE may be configured to identify a TDD pattern where the PT-RS 650 may be applied based on the TDD pattern. For example, as illustrated in the TDD slot configuration diagram 600, the PT-RS 650 may be enabled in the first D slot 602a that follows gap symbols 656/uplink resources 654 of the S slot 606 and/or the U slot 604, while remaining slots in the TDD configuration (e.g., 602b, 602c, 606) may have the PT-RS 650 disabled. Thus, the PT-RS 650 may be enabled for the first D slot 602a in the TDD configuration regardless of whether a particular UE is utilizing the first D slot 602a. Hence, the PT-RS 650 may be enabled for the UE even if the UE does not have a discontinuity at the first D slot 602a of the TDD configuration, and no other D slots (e.g., 602b-602c) in the TDD configuration may include the PT-RS 605. Such techniques may correspond to blind estimation procedures based on a fixed configuration for the PT-RS 605.

In other examples, the UE may identify a discontinuity and schedule the PT-RS 650 based on the identified discontinuity. For instance, the UE may be scheduled with the U slot 604/614/624, but not scheduled to receive downlink data in the first D slot 602a/612a/622a that follows the U slot 604/614/624. Instead, the UE may be scheduled to receive downlink data in the second D slot (e.g., 602a/612b/622b) that follows the U slot 604/614/624. Since the UE may not receive any data in the first D slot 602a/612a/622a, the 1-2% BLER may be associated with the second D slot (e.g., 602a/612b/622b) based on the discontinuity being continued for an additional slot. Thus, blindly enabling a fixed configuration for the PT-RS 650 in the first D slot 602a/612a/622a of the TDD configuration may not account for the discontinuity if the UE is associated with different scheduling that extends the discontinuity beyond the first D slot 602a/612a/622a of the TDD configuration. The TDD configuration may be relative to the base station, and not relative to the UE, which may result in increased complexity in some cases but may provide for a more efficient configuration for the PT-RS 650.

As illustrated in the TDD slot configuration diagram 610, a periodicity may be implemented for the PT-RS 650 to be re-enabled in certain D slots (e.g., 612b) to avoid having the PT-RS 650 being absent from too many slots that may utilize the PT-RS 650. Further, the PT-RS periodicity may be reset after each discontinuity is detected by the UE, such that the first D slot 612a after the discontinuity/U slot 614 includes the PT-RS 650. For semi-persistent scheduling and aggregated scheduling, the UE may be scheduled in the first D slot 612a that follows the discontinuity/U slot 614 and may enable the PT-RS 650 in the first D slot 612a that follows the discontinuity/U slot 614.

As illustrated in the TDD slot configuration diagram 620, the PT-RS 650 may be configured with different PT-RS densities (e.g., higher density PT-RS may be included in the first D slot 622a that follows the discontinuity/U slot 624 and lower density PT-RS may be included in subsequent slots (e.g., 622b, 622c, 626) in the TDD configuration). Having the PT-RS 650 in only the first D slot of a longer series of D slots (e.g., 7-8 continuous D slots) may result in the PT-RS 650 being insufficient to estimate the phase for the entire longer series of D slots, and may trigger the PT-RS 650 to be included in one or more of the subsequent slots, as illustrated via the TDD slot configuration diagram 610.

In the TDD slot configuration diagram 600, the UE may identify the discontinuity and enable the PT-RS 650 in the first D slot 602a for each repetition of the TDD configuration. The first D slot 602a may correspond to a network-wide configuration, where regardless of UE scheduling the PT-RS 650 may be enabled in the first D slot 602a after the U slot 604 based on the TDD configuration. Determining the UE scheduling and a time at which the discontinuity is expected to occur may also allow the PT-RS 650 to be enabled in the first D slot that the UE is scheduled to receive downlink information after the U slot 604. In some cases, the first D slot that the UE is scheduled to receive downlink information may be the D slot (e.g., 602a) that immediately follows the discontinuity/U slot 604 or a subsequent D slot (e.g., 602b-602c) in the TDD configuration (e.g., if the discontinuity is maintained over one or more initial D slots in the TDD configuration).

In the TDD slot configuration diagram 610, the PT-RS 650 may be enabled in the first D slot 612a and include a periodicity of 2 slots. For TDD configurations that have an extended series of D slots (e.g., 7-8 continuous D slots), including the PT-RS 650 in only the first D slot 612a may result in the PT-RS 650 being insufficient to estimate the phase over the entire TDD configuration. Thus, the PT-RS 650 may be included in the first D slot 612a of the TDD configuration, but also included in one or more subsequent slots (e.g., 612b, 612c, 616) so that a reliability of the phase estimation may be maintained over the entire TDD configuration. For example, based on the periodicity of 2 slots, the PT-RS 650 may be enabled in the first D slot 612a of the TDD configuration and the third D slot (e.g., 612c) of the TDD configuration.

A periodicity of 2 in the TDD slot configuration diagram 610 may further result in a PT-RS enabling event being aligned with the U slot 614 (e.g., at a third period for the PT-RS 650). In cases where the PT-RS enabling event aligns with the U slot 614, the periodicity may be reset at the first D slot 612a that follows the U slot 614. Such techniques may ensure that the PT-RS 650 is enabled at the first D slot 612a for each repetition of the TDD configuration, rather than having the PT-RS 650 being enabled at the second D slot (e.g., 612b) of a subsequent TDD repetition and skipping the first D slot 612a of the subsequent TDD repetition, as may otherwise occur if the PT-RS periodicity is not reset at the first D slot 612a.

In the TDD slot configuration diagram 620, the PT-RS 650 may be enabled in continuous slots, but with different densities. For example, the PT-RS 650 may be enabled with a higher density in the first D slot 622a of the TDD configuration, which may follow a discontinuity/U slot 624. The first D slot 622a may have a higher BLER than the remaining slots (e.g., 622b, 622c, 626) of the TDD configuration and may therefore include the higher density PT-RS. Lower density PT-RS may be enabled for the remaining slots (e.g., 622b, 622c, 626) of the TDD configuration, as the remaining slots (e.g., 622b, 622c, 626) may have a lower BLER or no BLER.

The UE may transmit a PT-RS recommendation to the base station, which may configure a PT-RS pattern for the D slots 602a-602c/612a-612c/622a-622c based on the PT-RS recommendation. The UE may also transmit a PT-RS recommendation for the S slot 606/616/626 to configure the S slot 606/616/626 with PT-RS 650. The UE may indicate a PT-RS slot-offset, a PT-RS density in time and frequency domains, and/or a periodicity between consecutive transmissions via a UE capability message (e.g., which may be referred to in some examples as "ptrs-DensityRecommendationSetDL", "ptrs-DensityRecommendationSetUL", or by another name). The UE capability message may be indicative of a list of different PT-RS patterns, such that the UE may dynamically signal a particular PT-RS pattern to the base station via a PT-RS pattern index using a MAC-CE over a PUSCH.

In further examples, rather than configuring the S slot 606/616 with PT-RS 650, the S slot 606/616 may be configured with high density DMRS. The UE may indicate to the base station whether the UE has a phase discontinuity associated with the S slot 606/616, so that the base station may configure the S slot 606/616 with the high density DMRS based on the UE indication. The base station may configure multiple DMRS patterns (e.g., via RRC) based on different additional DMRS positions and slot offsets. Similar techniques may likewise be performed for uplink procedures, as the base station may also experience a phase discontinuity in the S slot 606/616/626 (e.g., after one or more gap symbols 656 that follows the downlink resources 652 and/or the PT-RS 650).

PT-RS occasions having different PT-RS densities may be configured through RRC (e.g., based on an MCS configuration and/or a frequency density associated with a number of RBs configured for the PT-RS 650). The different PT-RS densities may correspond to multiple configurations, such as config1, config2, etc. The MAC-CE may indicate that an active PT-RS configuration is configX out of Y total configurations. The MAC-CE may be used to enable/disable certain PT-RS densities in a periodic manner. A set of PT-RS configurations may be comprised of respective PT-RS configurations, which may be enabled/disabled one at a time based on particular use cases. For example, if the TDD slot configuration diagram 600 is determined to be insufficient for estimating the phase, the TDD slot configuration diagram 610 may be activated for attempting to estimate the phase. Similarly, if the TDD slot configuration diagram 610 is determined to be insufficient for estimating the phase, the TDD slot configuration diagram 620 may be activated for attempting to estimate the phase.

PT-RS periodicity and/or discontinuity detection protocols may be configured via RRC and dynamically controlled via MAC-CE. Each resource set for the PT-RS configuration may correspond to a particular set of rules/protocols. Different rules/protocols may be communicated via RRC for resetting the PT-RS density, enabling PT-RS 650 in particular D slots, etc. The techniques described herein may also apply to different frequency ranges, frequency bands, subcarrier spacing, MCSs, frequency domain RBs, time domain symbol allocations, etc. For example, for FR1 the first D slot in the TDD configuration may include low density PT-RS, but for FR2 the first D slot in the TDD configuration may include high density PT-RS.

Figure 7:
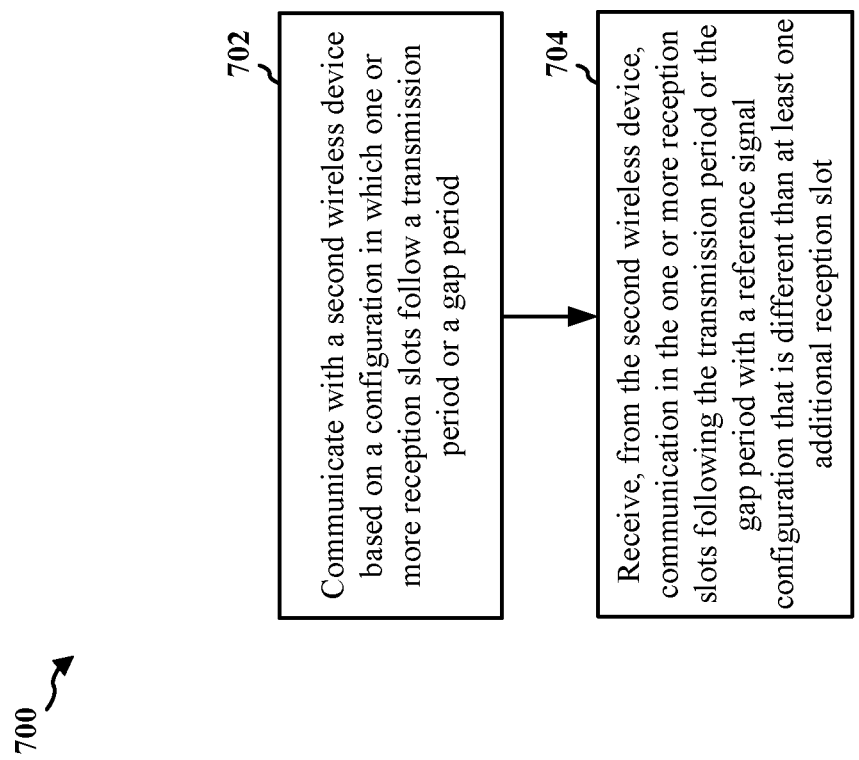
FIG. 7 is a flowchart of a method of wireless communication at a first wireless device.

FIG. 7 is a flowchart 700 of a method of wireless communication. The method may be performed by a first wireless device (e.g., UE 104, base station 102, first wireless device 402; the apparatuses 1102, 1202; etc.), which may include the memory 360 and which may be the entire first wireless device (e.g., UE 104, base station 102, first wireless device 402) or a component of the first wireless device (e.g., UE 104, base station 102, first wireless device 402), such as the TX processor 368, the RX processor 356, and/or the controller/processor 359.

At 702, the first wireless device may communicate with a second wireless device based on a configuration in which one or more reception slots follow a transmission period or a gap period. For example, referring to FIGS. 4-6, the first wireless device 402 may communicate, at 414, with the second wireless device 404 based on the configuration that includes the one or more symbols of the first D slot (e.g.,

502a, 512a, 602a, 612a, 622a) that follow the one or more gap symbols (e.g., 556, 656) and/or the one or more symbols of the U slot (e.g., 504, 514, 604, 614, 624). The communication, at 702, may be performed by either of the Rx reference signal configuration components 1140/1240 of the apparatuses 1102/1202 in FIGS. 11 and 12.

At 704, the first wireless device may receive, from the second wireless device, communication in the one or more reception slots following the transmission period or the gap period with a reference signal configuration that is different than at least one additional reception slot. For example, referring to FIGS. 4 and 6, the first wireless device 402 may receive, at 416, communication from the second wireless device 404 in symbol(s) associated with a reference signal configuration that is different than other symbol(s). For instance, the symbol(s) may correspond to the one or more symbols of the first D slot (e.g., 602a, 612a, 622a) that follow the one or more gap symbols (e.g., 656) and/or the one or more symbols of the U slot (e.g., 604, 614, 624), and the other symbol(s) may correspond to one or more symbols of subsequent slots (e.g., 602b, 602c, 606, 612b, 616, 622b, 622c, 626) in the TDD configuration. The reception, at 704, may be performed by either of the Rx reference signal configuration components 1140/1240 of the apparatuses 1102/1202 in FIGS. 11 and 12.

Figure 8:
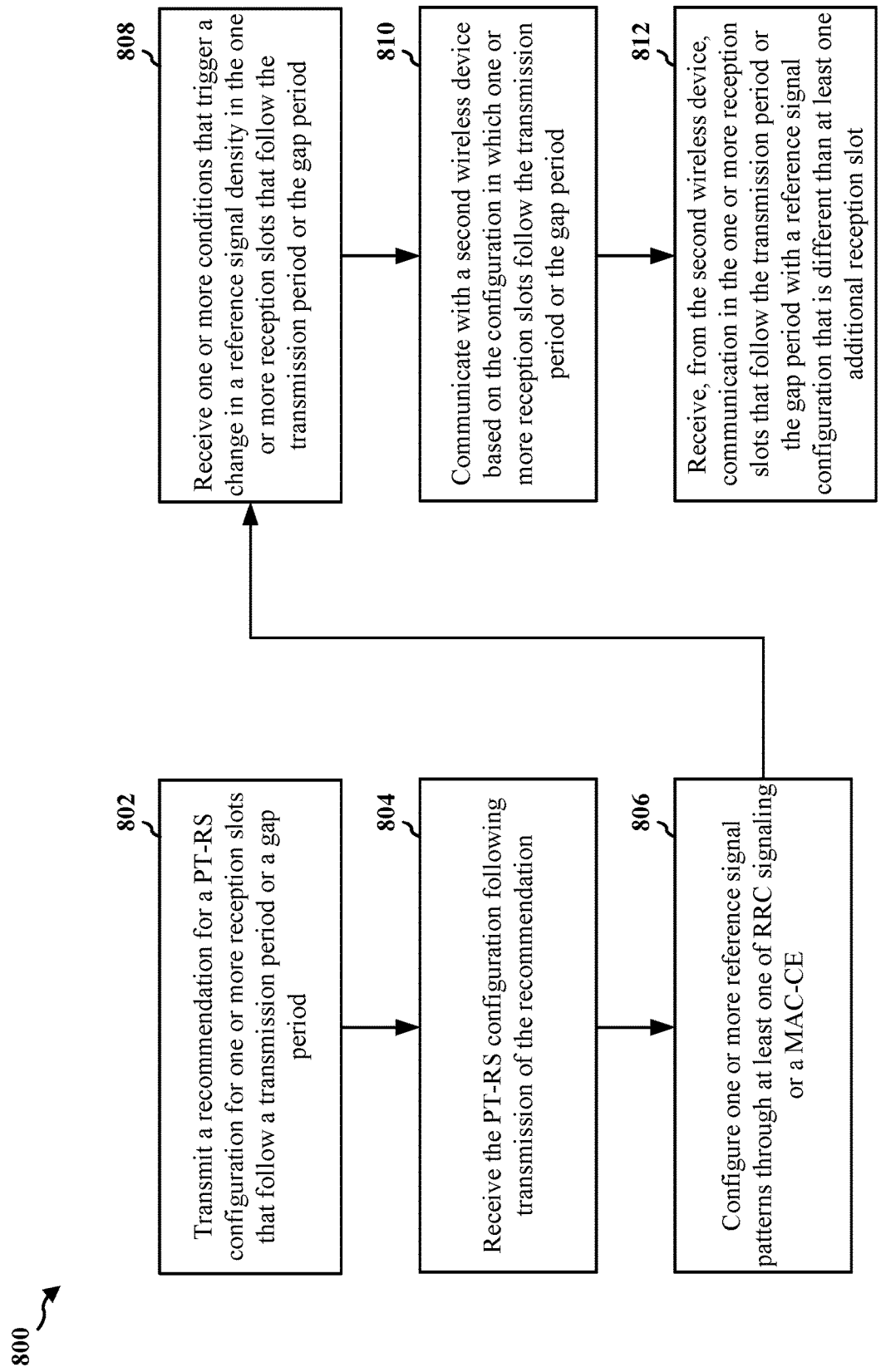
FIG. 8 is a flowchart of a method of wireless communication at a first wireless device.

FIG. 8 is a flowchart 800 of a method of wireless communication. The method may be performed by a first wireless device (e.g., UE 104, base station 102, first wireless device 402; the apparatuses 1102, 1202; etc.), which may include the memory 360 and which may be the entire first wireless device (e.g., UE 104, base station 102, first wireless device 402) or a component of the first wireless device (e.g., UE 104, base station 102, first wireless device 402), such as the TX processor 368, the RX processor 356, and/or the controller/processor 359.

At 802, the first wireless device may transmit a recommendation for a PT-RS configuration for one or more reception slots that follow a transmission period or a gap period. For example, referring to FIGS. 4-6, the first wireless device 402 (e.g., a UE) may transmit, at 406, a PT-RS configuration recommendation to the second wireless device 404 (e.g., a base station). The recommendation may be for one or more symbols of a first D slot (e.g., 502a, 512a, 602a, 612a, 622a) that follows one or more gap symbols (e.g., 556, 656) and/or one or more symbols of a U slot (e.g., 504, 514, 604, 614, 624), and may be indicative of a PT-RS slot offset, a time domain density for a PT-RS, a frequency domain density for the PT-RS, a time period between consecutive transmissions of the PT-RS, and/or an index associated with a PT-RS pattern configured through RRC. The transmission, at 802, may be performed by either of the Rx reference signal configuration components 1140/1240 of the apparatuses 1102/1202 in FIGS. 11 and 12.

At 804, the first wireless device may receive the PT-RS configuration following transmission of the recommendation. For example, referring to FIG. 4, the first wireless device 402 may receive, at 408, the PT-RS configuration from the second wireless device 404 based on transmission, at 406, of the PT-RS configuration recommendation to the second wireless device 404. The reception, at 804, may be performed by either of the Rx reference signal configuration components 1140/1240 of the apparatuses 1102/1202 in FIGS. 11 and 12.

At 806, the first wireless device may configure one or more reference signal patterns through at least one of RRC signaling or a MAC-CE. For example, referring to FIGS. 4 and 6, the first wireless device 402 may configure, at 410a, one or more reference signal patterns via RRC or MAC-CE. In examples, the one or more reference signal patterns configured, at 410a, may correspond to the TDD slot configuration diagrams 600, 610, and 620. The configuration, at 806, may be performed by either of the Rx reference signal configuration components 1140/1240 of the apparatuses 1102/1202 in FIGS. 11 and 12.

At 808, the first wireless device may receive one or more conditions that trigger a change in a reference signal density in the one or more reception slots that follow the transmission period or the gap period. For example, referring to FIGS. 4-6, the first wireless device 402 may receive, at 412, trigger condition(s) for reference signal density from the second wireless device 404 for one or more symbols of a first D slot (e.g., 502a, 512a, 602a, 612a, 622a) that follows one or more gap symbols (e.g., 556, 656) and/or one or more symbols of a U slot (e.g., 504, 514, 604, 614, 624). The trigger condition(s) received, at 412, may be indicative of a frequency range, a frequency band, a subcarrier spacing, an MCS, a frequency domain RB, or a time domain symbol allocation. The reception, at 808, may be performed by either of the Rx reference signal configuration components 1140/1240 of the apparatuses 1102/1202 in FIGS. 11 and 12.

At 810, the first wireless device may communicate with a second wireless device based on the configuration in which one or more reception slots follow the transmission period or the gap period. For example, referring to FIGS. 4-6, the first wireless device 402 may communicate, at 414, with the second wireless device 404 based on the configuration that includes the one or more symbols of the first D slot (e.g., 502a, 512a, 602a, 612a, 622a) that follow the one or more gap symbols (e.g., 556, 656) and/or the one or more symbols of the U slot (e.g., 504, 514, 604, 614, 624). In examples, the first wireless device 402 may be a UE, the one or more reception slots may be one or more downlink symbols, and the transmission period may be an uplink period for uplink transmission. In further examples, the first wireless device 402 may be a base station, the one or more reception slots may be one or more uplink symbols, and the transmission period may be a downlink period for downlink transmission. The communication, at 810, may be performed by either of the Rx reference signal configuration components 1140/1240 of the apparatuses 1102/1202 in FIGS. 11 and 12.

At 812, the first wireless device may receive, from the second wireless device, communication in the one or more reception slots that follow the transmission period or the gap period with a reference signal configuration that is different than at least one additional reception slot. For example, referring to FIGS. 4 and 6, the first wireless device 402 may receive, at 416, communication from the second wireless device 404 in symbol(s) associated with a reference signal configuration that is different than other symbol(s). For instance, the symbol(s) may correspond to the one or more symbols of the first D slot (e.g., 602a, 612a, 622a) that follow the one or more gap symbols (e.g., 656) and/or the one or more symbols of the U slot (e.g., 604, 614, 624), and the other symbol(s) may correspond to one or more symbols of subsequent slots (e.g., 602b, 602c, 606, 612b, 616, 622b, 622c, 626) in the TDD configuration. The reference signal configuration received, at 408, may be for a PT-RS or a DMRS. Reference signal reception may be enabled for the one or more reception slots following the transmission period or the gap period, and the reference signal reception may be disabled for the at least one additional reception slot. The reference signal configuration received, at 408, may include a period between symbols in which a reference signal is enabled. The one or more reception slots (e.g., associated with the first D slot 622*a*) following the transmission period (e.g., associated with the U slot 624) or the gap period (e.g., associated with the gap symbols 656) may include a reference signal having a first density, and the at least one additional reception slot (e.g., associated with the subsequent slots 622*b*, 622*c*, and 626) may include the reference having a second density, where the first density is higher than the second density. The communication received, at 416, in the one or more reception slots may correspond to a plurality of intra-slot TBs, such as in TypeB allocations of PDSCH or PUSCH. The reception, at 812, may be performed by either of the Rx reference signal configuration components 1140/1240 of the apparatuses 1102/1202 in FIGS. 11 and 12.

Figure 9:
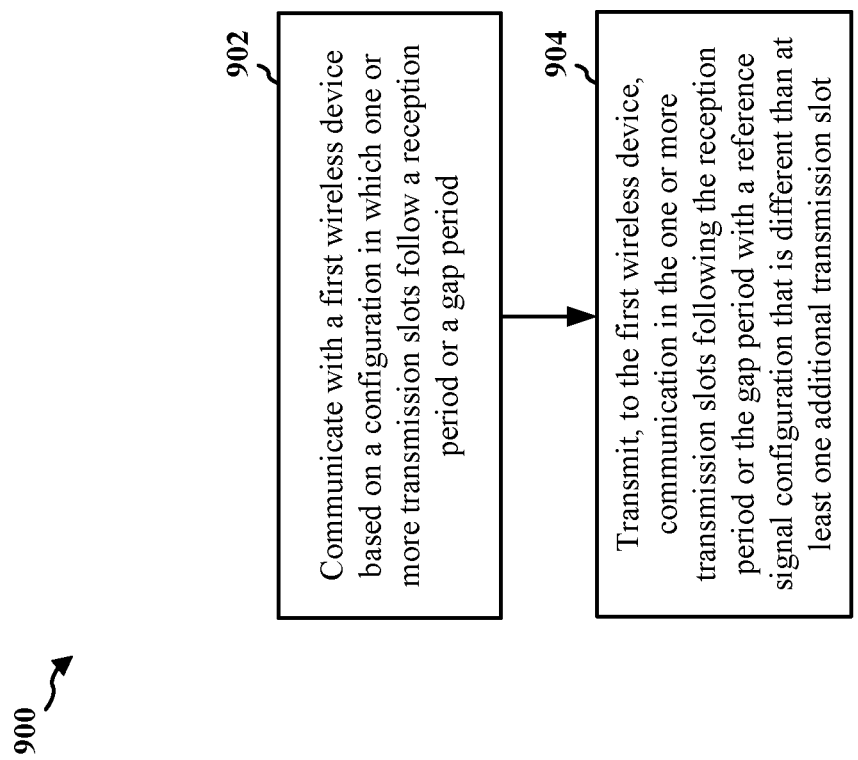
FIG. 9 is a flowchart of a method of wireless communication at a second wireless device.

FIG. 9 is a flowchart 900 of a method of wireless communication. The method may be performed by a second wireless device (e.g., UE 104, base station 102, second wireless device 404; the apparatuses 1102, 1202; etc.), which may include the memory 360 and which may be the entire second wireless device (e.g., UE 104, base station 102, second wireless device 404) or a component of the second wireless device (e.g., UE 104, base station 102, second wireless device 404), such as the TX processor 368, the RX processor 356, and/or the controller/processor 359.

At 902, the second wireless device may communicate with a first wireless device based on a configuration in which one or more transmission slots follow a reception period or a gap period. For example, referring to FIGS. 4-6, the second wireless device 404 may communicate, at 414, with the first wireless device 402 based on the configuration that includes the one or more symbols of the first D slot (e.g., 502*a*, 512*a*, 602*a*, 612*a*, 622*a*) that follow the one or more gap symbols (e.g., 556, 656) and/or the one or more symbols of the U slot (e.g., 504, 514, 604, 614, 624). The communication, at 902, may be performed by either of the Tx reference signal configuration components 1142/1242 of the apparatuses 1102/1202 in FIGS. 11 and 12.

At 904, the second wireless device may transmit, to the first wireless device, communication in the one or more transmission slots following the reception period or the gap period with a reference signal configuration that is different than at least one additional transmission slot. For example, referring to FIGS. 4 and 6, the second wireless device 404 may transmit, at 416, communication to the first wireless device 402 in symbol(s) associated with a reference signal configuration that is different than other symbol(s). For instance, the symbol(s) may correspond to the one or more symbols of the first D slot (e.g., 602*a*, 612*a*, 622*a*) that follow the one or more gap symbols (e.g., 656) and/or the one or more symbols of the U slot (e.g., 604, 614, 624), and the other symbol(s) may correspond to one or more symbols of subsequent slots (e.g., 602*b*, 602*c*, 606, 612*b*, 616, 622*b*, 622*c*, 626) in the TDD configuration. The transmission, at 904, may be performed by either of the Tx reference signal configuration components 1142/1242 of the apparatuses 1102/1202 in FIGS. 11 and 12.

Figure 10:
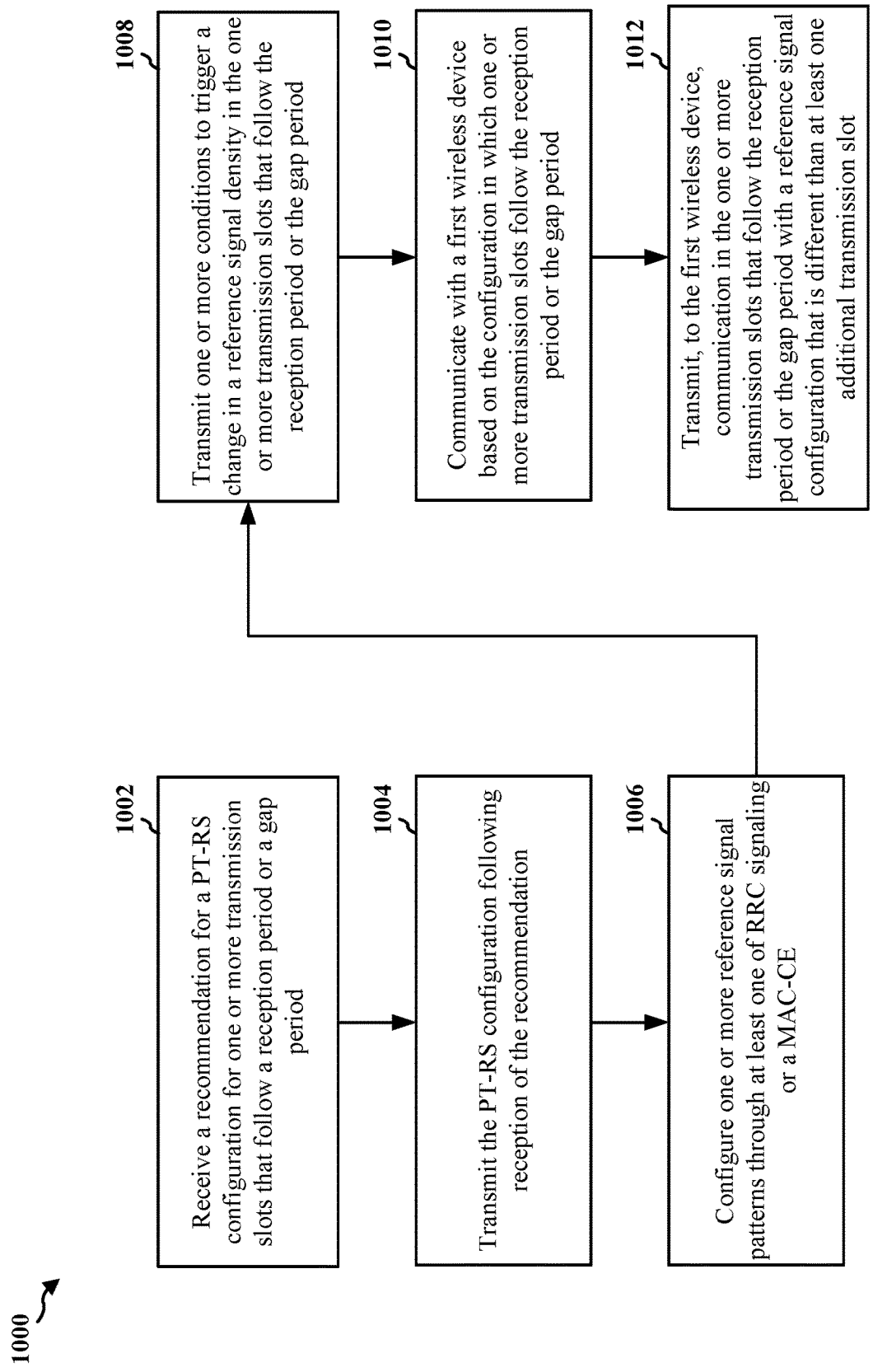
FIG. 10 is a flowchart of a method of wireless communication at a second wireless device.

FIG. 10 is a flowchart 1000 of a method of wireless communication. The method may be performed by a second wireless device (e.g., UE 104, base station 102, second wireless device 404; the apparatuses 1102, 1202; etc.), which may include the memory 360 and which may be the entire second wireless device (e.g., UE 104, base station 102, second wireless device 404) or a component of the second wireless device (e.g., UE 104, base station 102, second wireless device 404), such as the TX processor 368, the RX processor 356, and/or the controller/processor 359.

At 1002, the second wireless device may receive a recommendation for a PT-RS configuration for one or more transmission slots that follow a reception period or a gap period. For example, referring to FIGS. 4-6, the second wireless device 404 (e.g., a base station) may receive, at 406, a PT-RS configuration recommendation from the first wireless device 402 (e.g., a UE). The recommendation may be for one or more symbols of a first D slot (e.g., 502*a*, 512*a*, 602*a*, 612*a*, 622*a*) that follows one or more gap symbols (e.g., 556, 656) and/or one or more symbols of a U slot (e.g., 504, 514, 604, 614, 624), and may be indicative of a PT-RS slot offset, a time domain density for a PT-RS, a frequency domain density for the PT-RS, a time period between consecutive transmissions of the PT-RS, and/or an index associated with a PT-RS pattern configured through RRC. The reception, at 1002, may be performed by either of the Tx reference signal configuration components 1142/1242 of the apparatuses 1102/1202 in FIGS. 11 and 12.

At 1004, the second wireless device may transmit the PT-RS configuration following reception of the recommendation. For example, referring to FIG. 4, the second wireless device 404 may transmit, at 408, the PT-RS configuration to the first wireless device 402 based on reception, at 406, of the PT-RS configuration recommendation from the first wireless device 402. The transmission, at 1004, may be performed by either of the Tx reference signal configuration components 1142/1242 of the apparatuses 1102/1202 in FIGS. 11 and 12.

At 1006, the second wireless device may configure one or more reference signal patterns through at least one of RRC signaling or a MAC-CE. For example, referring to FIGS. 4 and 6, the second wireless device 404 may configure, at 410*b*, one or more reference signal patterns via RRC or MAC-CE. In examples, the one or more reference signal patterns configured, at 410*b*, may correspond to the TDD slot configuration diagrams 600, 610, and 620. The configuration, at 1006, may be performed by either of the Tx reference signal configuration components 1142/1242 of the apparatuses 1102/1202 in FIGS. 11 and 12.

At 1008, the second wireless device may transmit one or more conditions to trigger a change in a reference signal density in the one or more transmission slots that follow the reception period or the gap period. For example, referring to FIGS. 4-6, the second wireless device 404 may transmit, at 412, trigger condition(s) for reference signal density to the first wireless device 402 for one or more symbols of a first D slot (e.g., 502*a*, 512*a*, 602*a*, 612*a*, 622*a*) that follows one or more gap symbols (e.g., 556, 656) and/or one or more symbols of a U slot (e.g., 504, 514, 604, 614, 624). The trigger condition(s) transmitted, at 412, may be indicative of a frequency range, a frequency band, a subcarrier spacing, an MCS, a frequency domain RB, or a time domain symbol allocation. The transmission, at 1008, may be performed by either of the Tx reference signal configuration components 1142/1242 of the apparatuses 1102/1202 in FIGS. 11 and 12.

At 1010, the second wireless device may communicate with a first wireless device based on the configuration in which one or more transmission slots follow the reception period or the gap period. For example, referring to FIGS. 4-6, the second wireless device 404 may communicate, at 414, with the first wireless device 402 based on the configuration that includes the one or more symbols of the first D slot (e.g., 502*a*, 512*a*, 602*a*, 612*a*, 622*a*) that follow the one or more gap symbols (e.g., 556, 656) and/or the one or more symbols of the U slot (e.g., 504, 514, 604, 614, 624). The configuration, at 1010, may be performed by either of the Tx reference signal configuration components 1142/1242 of the apparatuses 1102/1202 in FIGS. 11 and 12.

At 1012, the second wireless device may transmit, to the first wireless device, communication in the one or more transmission slots that follow the reception period or the gap period with a reference signal configuration that is different than at least one additional transmission slot. For example, referring to FIGS. 4 and 6, the second wireless device 404 may transmit, at 416, communication to the first wireless device 402 in symbol(s) associated with a reference signal configuration that is different than other symbol(s). For instance, the symbol(s) may correspond to the one or more symbols of the first D slot (e.g., 602a, 612a, 622a) that follow the one or more gap symbols (e.g., 656) and/or the one or more symbols of the U slot (e.g., 604, 614, 624), and the other symbol(s) may correspond to one or more symbols of subsequent slots (e.g., 602b, 602c, 606, 612b, 616, 622b, 622c, 626) in the TDD configuration. In examples, the second wireless device 404 may be a UE or a base station, and the reference signal configuration transmitted, at 408, may be for a PT-RS or a DMRS. Reference signal transmission may be enabled for the one or more transmission slots following the reception period of time or the gap period, and the reference signal transmission may be disabled for the at least one additional transmission slot. The one or more transmission slots (e.g., associated with the first D slot 622a) following the reception period (e.g., associated with the U slot 624) or the gap period (e.g., associated with the gap symbols 656) may include a reference signal having a first density, and the at least one additional transmission slot (e.g., associated with the subsequent slots 622b, 622c, and 626) may include the reference having a second density, where the first density is higher than the second density. The communication transmitted, at 416, in the one or more transmission slots may correspond to a plurality of intra-slot TBs, such as in TypeB allocations of PDSCH or PUSCH. The transmission, at 1012, may be performed by either of the Tx reference signal configuration components 1142/1242 of the apparatuses 1102/1202 in FIGS. 11 and 12.

Figure 11:
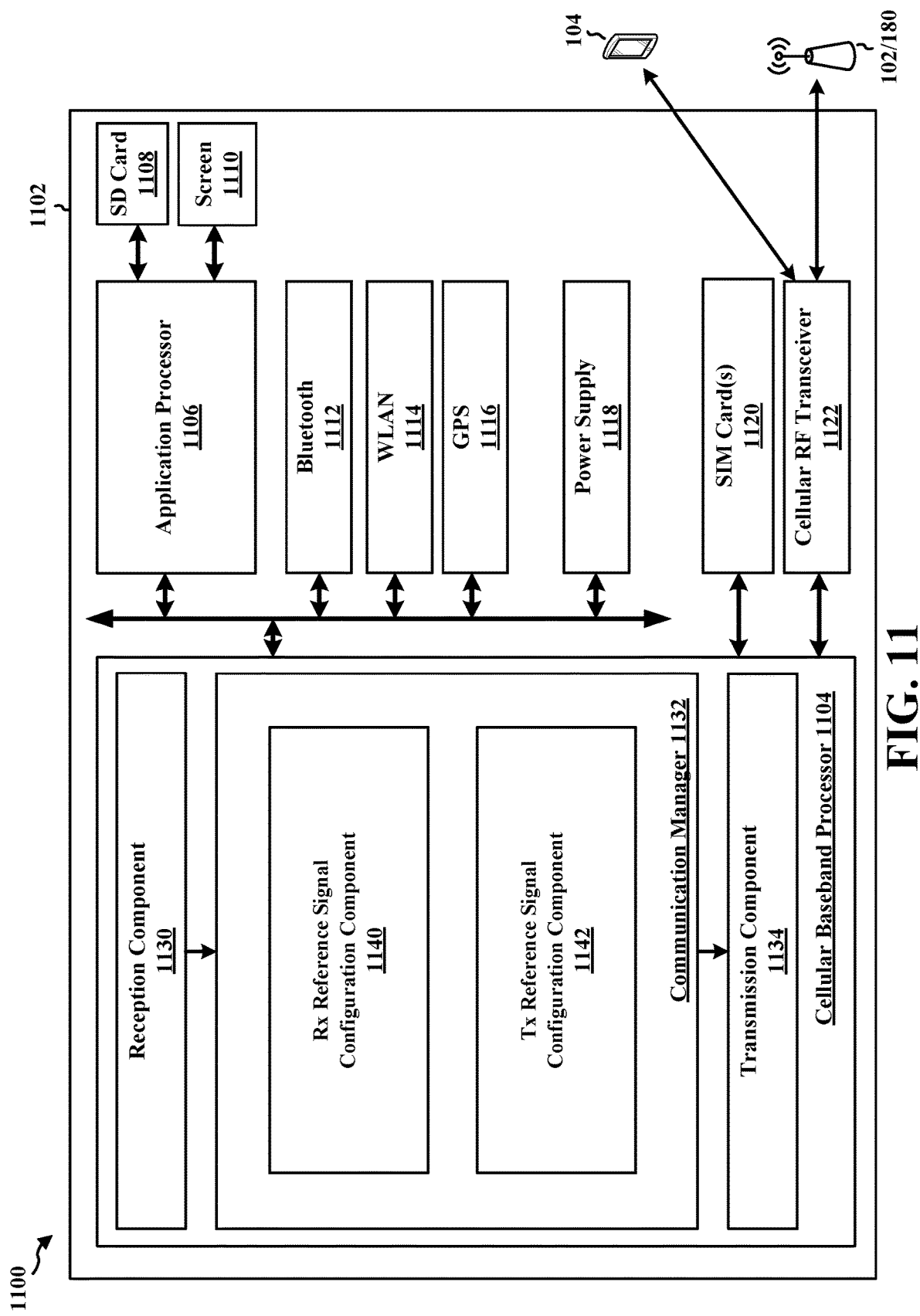
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an Rx reference signal configuration component 1140 that is configured, e.g., as described in connection with 702-704 and 802-812, to transmit a recommendation for a PT-RS configuration for one or more reception slots that follow a transmission period or a gap period; to receive the PT-RS configuration following transmission of the recommendation; configure one or more reference signal patterns through at least one of RRC signaling or a MAC-CE; receive one or more conditions that trigger a change in a reference signal density in the one or more reception slots that follow the transmission period or the gap period; to communicate with a second wireless device based on the configuration in which one or more reception slots follow the transmission period or the gap period; and to receive, from the second wireless device, communication in the one or more reception slots that follow the transmission period or the gap period with a reference signal configuration that is different than at least one additional reception slot.

The communication manager 1132 further includes a Tx reference signal configuration component 1142 that is configured, e.g., as described in connection with 902-904 and 1002-1012, to receive a recommendation for a PT-RS configuration for one or more transmission slots that follow a reception period or a gap period; to transmit the PT-RS configuration following reception of the recommendation; to configure one or more reference signal patterns through at least one of RRC signaling or a MAC-CE; transmit one or more conditions to trigger a change in a reference signal density in the one or more transmission slots that follow the reception period or the gap period; communicate with a first wireless device based on the configuration in which one or more transmission slots follow the reception period or the gap period; and to transmit, to the first wireless device, communication in the one or more transmission slots that follow the reception period or the gap period with a reference signal configuration that is different than at least one additional transmission slot.

The apparatus may include additional components that perform each of the blocks of the algorithm in the flowcharts of FIGS. 7-10. As such, each block in the flowcharts of FIGS. 7-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for communicating with a second wireless device based on a configuration in which one or more reception slots follow a transmission period or a gap period; and means for receiving, from the second wireless device, communication in the one or more reception slots following the transmission period or the gap period with a reference signal configuration that is different than at least one additional reception slot. The apparatus 1102 further includes means for transmitting a recommendation for a PT-RS configuration for the one or more reception slots following the transmission period or the gap period, the recommendation indicating one or more of: a PT-RS slot offset, a time domain density for a PT-RS, a frequency domain density for the PT-RS, a time period between consecutive transmissions of the PT-RS, or an index associated with a PT-RS pattern configured through RRC; and means for receiving the PT-RS configuration following transmission of the recommendation to the base station. The apparatus 1102 further includes means for configuring one or more RS patterns through at least one of RRC signaling or a MAC-CE. The apparatus 1102 further includes means for receiving one or more conditions to trigger a change in an RS density in the one or more reception slots following the transmission period or the gap period, the one or more conditions being based on at least one of a frequency range, a frequency band, a subcarrier spacing, an MCS, a frequency domain RB, or a time domain symbol allocation.

In further configuration, the apparatus 1102, and in particular the cellular baseband processor 1104, includes means for communicating with a first wireless device based on a configuration in which one or more transmission slots follow a reception period or a gap period; and means for transmitting, to the first wireless device, communication in the one or more transmission slots following the reception period or the gap period with a reference signal configuration that is different than at least one additional transmission slot. The apparatus 1102 further includes means for receiving a recommendation for a PT-RS configuration for the one or more transmission slots following the reception period or the gap period, the recommendation indicating one or more of: a PT-RS slot offset, a time domain density for a PT-RS, a frequency domain density for the PT-RS, a time period between consecutive transmissions of the PT-RS, or an index associated with a PT-RS pattern configured through RRC; and means for transmitting the PT-RS configuration following reception of the recommendation from the UE. The apparatus 1102 further includes means for configuring one or more RS patterns through at least one of RRC signaling or a MAC-CE. The apparatus 1102 further includes means for transmitting one or more conditions to trigger a change in an RS density in the one or more transmission slots following the reception period or the gap period, the one or more conditions being based on at least one of a frequency range, a frequency band, a subcarrier spacing, an MCS, a frequency domain RB, or a time domain symbol allocation.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
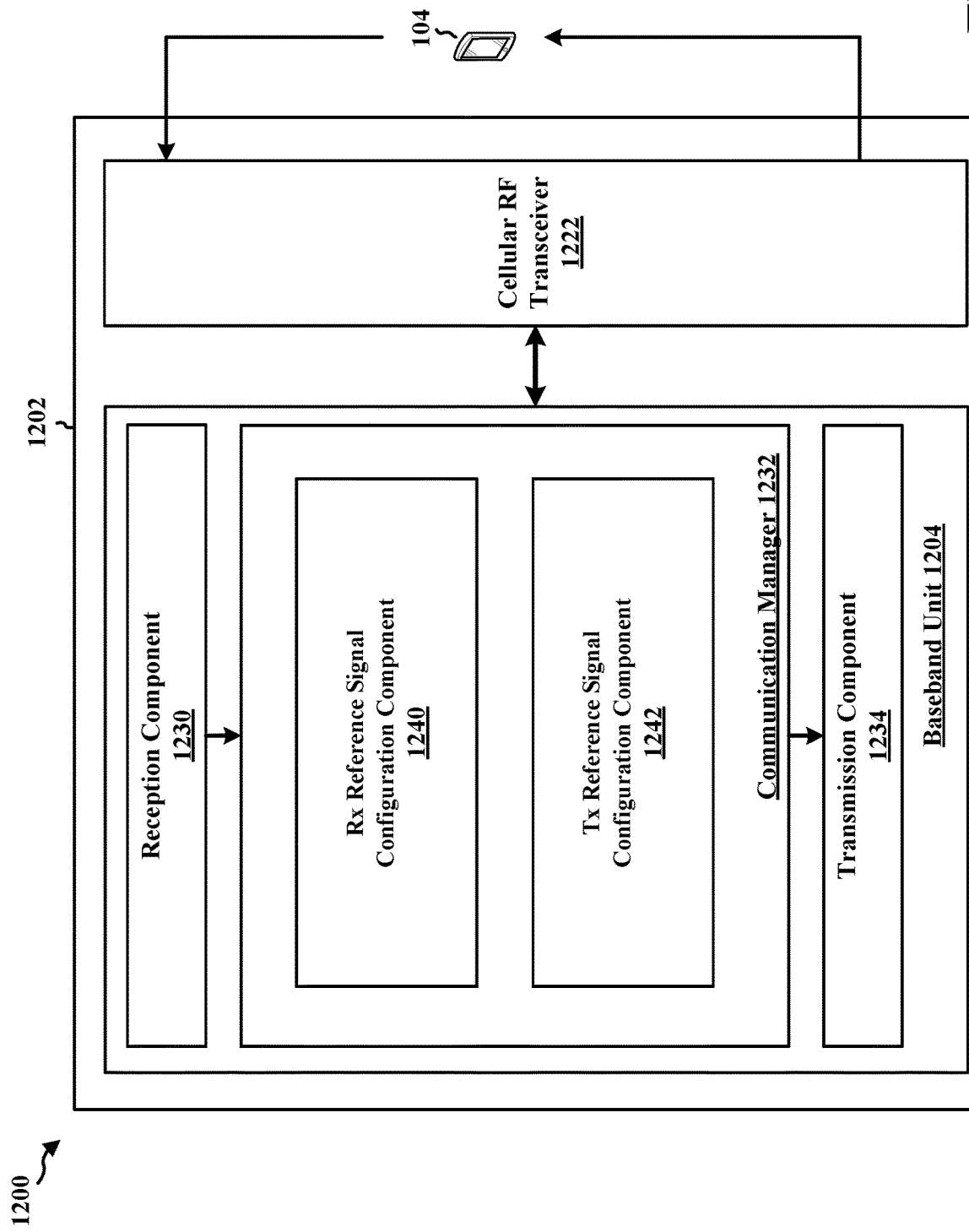
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an Rx reference signal configuration component 1240 that is configured, e.g., as described in connection with 702-704 and 802-812, to transmit a recommendation for a PT-RS configuration for one or more reception slots that follow a transmission period or a gap period; to receive the PT-RS configuration following transmission of the recommendation; configure one or more reference signal patterns through at least one of RRC signaling or a MAC-CE; receive one or more conditions that trigger a change in a reference signal density in the one or more reception slots that follow the transmission period or the gap period; to communicate with a second wireless device based on the configuration in which one or more reception slots follow the transmission period or the gap period; and to receive, from the second wireless device, communication in the one or more reception slots that follow the transmission period or the gap period with a reference signal configuration that is different than at least one additional reception slot.

The communication manager 1232 further includes a Tx reference signal configuration component 1242 that is configured, e.g., as described in connection with 902-904 and 1002-1012, to receive a recommendation for a PT-RS configuration for one or more transmission slots that follow a reception period or a gap period; to transmit the PT-RS configuration following reception of the recommendation; to configure one or more reference signal patterns through at least one of RRC signaling or a MAC-CE; transmit one or more conditions to trigger a change in a reference signal density in the one or more transmission slots that follow the reception period or the gap period; communicate with a first wireless device based on the configuration in which one or more transmission slots follow the reception period or the gap period; and to transmit, to the first wireless device, communication in the one or more transmission slots that follow the reception period or the gap period with a reference signal configuration that is different than at least one additional transmission slot.

The apparatus may include additional components that perform each of the blocks of the algorithm in the flowcharts of FIGS. 7-10. As such, each block in the flowcharts of FIGS. 7-10 may be performed by a component and the apparatus may include one or more of those components.

The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband unit 1204, includes means for communicating with a second wireless device based on a configuration in which one or more reception slots follow a transmission period or a gap period; and means for receiving, from the second wireless device, communication in the one or more reception slots following the transmission period or the gap period with a reference signal configuration that is different than at least one additional reception slot. The apparatus 1202 further includes means for transmitting a recommendation for a PT-RS configuration for the one or more reception slots following the transmission period or the gap period, the recommendation indicating one or more of: a PT-RS slot offset, a time domain density for a PT-RS, a frequency domain density for the PT-RS, a time period between consecutive transmissions of the PT-RS, or an index associated with a PT-RS pattern configured through RRC; and means for receiving the PT-RS configuration following transmission of the recommendation to the base station. The apparatus 1202 further includes means for configuring one or more RS patterns through at least one of RRC signaling or a MAC-CE. The apparatus 1202 further includes means for receiving one or more conditions to trigger a change in an RS density in the one or more reception slots following the transmission period or the gap period, the one or more conditions being based on at least one of a frequency range, a frequency band, a subcarrier spacing, an MCS, a frequency domain RB, or a time domain symbol allocation.

In further configuration, the apparatus 1202, and in particular the cellular baseband unit 1204, includes means for communicating with a first wireless device based on a configuration in which one or more transmission slots follow a reception period or a gap period; and means for transmitting, to the first wireless device, communication in the one or more transmission slots following the reception period or the gap period with a reference signal configuration that is different than at least one additional transmission slot. The apparatus 1202 further includes means for receiving a recommendation for a PT-RS configuration for the one or more transmission slots following the reception period or the gap period, the recommendation indicating one or more of: a PT-RS slot offset, a time domain density for a PT-RS, a frequency domain density for the PT-RS, a time period between consecutive transmissions of the PT-RS, or an index associated with a PT-RS pattern configured through RRC; and means for transmitting the PT-RS configuration following reception of the recommendation from the UE. The apparatus 1202 further includes means for configuring one or more RS patterns through at least one of RRC signaling or a MAC-CE. The apparatus 1202 further includes means for transmitting one or more conditions to trigger a change in an RS density in the one or more transmission slots following the reception period or the gap period, the one or more conditions being based on at least one of a frequency range, a frequency band, a subcarrier spacing, an MCS, a frequency domain RB, or a time domain symbol allocation.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including at least one processor coupled to a memory and configured to communicate with a second wireless device based on a configuration in which one or more reception slots follow a transmission period or a gap period; and receive, from the second wireless device, communication in the one or more reception slots following the transmission period or the gap period with a RS configuration that is different than at least one additional reception slot.

Aspect 2 may be combined with aspect 1 and includes that the RS configuration is for a PT-RS or a DMRS.

Aspect 3 may be combined with any of aspects 1-2 and includes that RS reception is enabled for the one or more reception slots following the transmission period or the gap period, and the RS reception is disabled for the at least one additional reception slot.

Aspect 4 may be combined with any of aspects 1-3 and includes that the RS configuration includes a period between symbols in which a RS is enabled.

Aspect 5 may be combined with any of aspects 1-4 and includes that the one or more reception slots following the transmission period or the gap period includes a RS having a first density, and the at least one additional reception slot includes the RS having a second density, the first density being higher than the second density.

Aspect 6 may be combined with any of aspects 1-5 and includes that the second wireless device corresponds to a base station, and that the at least one processor is further configured to: transmit, to the base station, a recommendation for a PT-RS configuration for the one or more reception slots following the transmission period or the gap period, the recommendation indicating one or more of: a PT-RS slot offset, a time domain density for a PT-RS, a frequency domain density for the PT-RS, a time period between consecutive transmissions of the PT-RS, or an index associated with a PT-RS pattern configured through RRC; and receive the PT-RS configuration following transmission of the recommendation to the base station.

Aspect 7 may be combined with any of aspects 1-6 and includes that the at least one processor is further configured to configure one or more RS patterns through at least one of RRC signaling or a MAC-CE.

Aspect 8 may be combined with any of aspects 1-7 and includes that the at least one processor is further configured to receive one or more conditions to trigger a change in an RS density in the one or more reception slots following the transmission period or the gap period, the one or more conditions being based on at least one of a frequency range, a frequency band, a subcarrier spacing, an MCS, a frequency domain RB, or a time domain symbol allocation.

Aspect 9 may be combined with any of aspects 1-8 and includes that the at least one processor is at a UE, the one or more reception slots being one or more downlink symbols, and the transmission period being an uplink period for uplink transmission, or wherein the at least one processor is at a base station, the one or more reception slots being one or more uplink symbols, and the transmission period being a downlink period for downlink transmission.

Aspect 10 may be combined with any of aspects 1-9 and includes that the communication received in the one or more reception slots corresponds to a plurality of intra-slot TBs.

Aspect 11 is an apparatus for wireless communication at a second wireless device including at least one processor coupled to a memory and configured to communicate with a first wireless device based on a configuration in which one or more transmission slots follow a reception period or a gap period; and transmit, to the first wireless device, communication in the one or more transmission slots following the reception period or the gap period with a RS configuration that is different than at least one additional transmission slot.

Aspect 12 may be combined with aspect 11 and includes that the second wireless device is a UE or a base station, and the RS configuration is for a PT-RS or a DMRS.

Aspect 13 may be combined with any of aspects 11-12 and includes that RS transmission is enabled for the one or more transmission slots following the reception period of time or the gap period, and the RS transmission is disabled for the at least one additional transmission slot.

Aspect 14 may be combined with any of aspects 11-13 and includes that the one or more transmission slots following the reception period or the gap period includes a RS having a first density, and the at least one additional transmission slot includes the RS having a second density, the first density being higher than the second density.

Aspect 15 may be combined with any of aspects 11-14 and includes that the first wireless device corresponds to a UE, and that the at least one processor is further configured to: receive, from the UE, a recommendation for a PT-RS configuration for the one or more transmission slots following the reception period or the gap period, the recommendation indicating one or more of: a PT-RS slot offset, a time domain density for a PT-RS, a frequency domain density for the PT-RS, a time period between consecutive transmissions of the PT-RS, or an index associated with a PT-RS pattern configured through RRC; and transmit the PT-RS configuration following reception of the recommendation from the UE.

Aspect 16 may be combined with any of aspects 11-15 and includes that the at least one processor is further configured to configure one or more RS patterns through at least one of RRC signaling or a MAC-CE.

Aspect 17 may be combined with any of aspects 11-16 and includes that the at least one processor is further configured to transmit one or more conditions to trigger a change in an RS density in the one or more transmission slots following the reception period or the gap period, the one or more conditions being based on at least one of a frequency range, a frequency band, a subcarrier spacing, an MCS, a frequency domain RB, or a time domain symbol allocation.

Aspect 18 may be combined with any of aspects 11-17 and includes that the communication transmitted in the one or more transmission slots corresponds to a plurality of intra-slot TBs.

Aspect 19 may be combined with any of aspects 1-18 and further includes at least one of an antenna or a transceiver coupled to the at least one processor.

Aspect 20 is a method of wireless communication for implementing any of aspects 1-19.

Aspect 21 is an apparatus for wireless communication including means for implementing any of aspects 1-19.

Aspect 22 is a computer-readable medium storing computer executable code, the code when executed by at least one processor causes the at least one processor to implement any of aspects 1-19.

What is claimed is:

1. An apparatus for wireless communication at a first wireless device, comprising:
   memory; and
   at least one processor coupled to the memory and configured to:
      communicate with a base station based on a configuration in which one or more reception slots follow a transmission period or a gap period;

transmit, to the base station, a recommendation for a phase tracking reference signal (PT-RS) configuration for the one or more reception slots that follow the transmission period or the gap period, wherein the recommendation indicates a PT-RS slot offset;

receive, following transmission of the recommendation to the base station, the PT-RS configuration that is different from a reference signal (RS) configuration of at least one additional reception slot; and receive, from the base station, communication in the one or more reception slots following the transmission period or the gap period based on the PT-RS configuration.

2. The apparatus of claim 1, wherein RS reception is enabled for the one or more reception slots following the transmission period or the gap period, and the RS reception is disabled for the at least one additional reception slot.

3. The apparatus of claim 1, wherein the RS configuration includes a period between symbols in which a RS is enabled.

4. The apparatus of claim 1, wherein the one or more reception slots following the transmission period or the gap period includes the PT-RS having a first density, and the at least one additional reception slot includes an RS having a second density, and wherein the first density is higher than the second density.

5. The apparatus of claim 1, wherein the recommendation indicates one or more of:
a time domain density for a PT-RS,
a frequency domain density for the PT-RS,
a time period between consecutive transmissions of the PT-RS, or
an index associated with a PT-RS pattern configured through radio resource control (RRC).

6. The apparatus of claim 1, wherein the at least one processor is further configured to configure one or more RS patterns through at least one of radio resource control (RRC) signaling or a medium access control-control element (MAC-CE).

7. The apparatus of claim 1, wherein the at least one processor is further configured to receive one or more conditions to trigger a change in an RS density in the one or more reception slots following the transmission period or the gap period, the one or more conditions being based on at least one of a frequency range, a frequency band, a subcarrier spacing, a modulation and coding scheme (MCS), a frequency domain resource block (RB), or a time domain symbol allocation.

8. The apparatus of claim 1, wherein the at least one processor is at a user equipment (UE), the one or more reception slots are one or more downlink symbols, and the transmission period is an uplink period for uplink transmission.

9. The apparatus of claim 1, wherein the communication received in the one or more reception slots corresponds to a plurality of intra-slot transport blocks (TBs).

10. The apparatus of claim 1, wherein the recommendation indicates one of a time domain density for a PT-RS or a frequency domain density for the PT-RS.

11. The apparatus of claim 1, wherein the recommendation indicates a time period between consecutive transmissions of the PT-RS.

12. The apparatus of claim 1, wherein the recommendation indicates an index associated with a PT-RS pattern configured through radio resource control (RRC).

13. An apparatus for wireless communication at a base station, comprising:
memory; and
at least one processor coupled to the memory and configured to:
communicate with a user equipment (UE) based on a configuration in which one or more transmission slots follow a reception period or a gap period;
receive, from the UE, a recommendation for a phase tracking reference signal (PT-RS) configuration for the one or more transmission slots that follow the reception period or the gap period, wherein the recommendation indicates a PT-RS slot offset;
transmit, following reception of the recommendation from the UE, the PT-RS configuration that is different from a reference signal (RS) configuration of at least one additional transmission slot; and
transmit, to the UE, communication in the one or more transmission slots following the reception period or the gap period based on the PT-RS configuration.

14. The apparatus of claim 13, wherein RS transmission is enabled for the one or more transmission slots following the reception period of time or the gap period, and the RS transmission is disabled for the at least one additional transmission slot.

15. The apparatus of claim 13, wherein the one or more transmission slots following the reception period or the gap period includes the PT-RS having a first density, and the at least one additional transmission slot includes an RS having a second density, and wherein the first density is higher than the second density.

16. The apparatus of claim 13, wherein the recommendation indicates one or more of:
a time domain density for a PT-RS,
a frequency domain density for the PT-RS,
a time period between consecutive transmissions of the PT-RS, or
an index associated with a PT-RS pattern configured through radio resource control (RRC).

17. The apparatus of claim 13, wherein the at least one processor is further configured to configure one or more RS patterns through at least one of radio resource control (RRC) signaling or a medium access control-control element (MAC-CE).

18. The apparatus of claim 13, wherein the at least one processor is further configured to transmit one or more conditions to trigger a change in an RS density in the one or more transmission slots following the reception period or the gap period, the one or more conditions being based on at least one of a frequency range, a frequency band, a subcarrier spacing, a modulation and coding scheme (MCS), a frequency domain resource block (RB), or a time domain symbol allocation.

19. The apparatus of claim 13, wherein the communication transmitted in the one or more transmission slots corresponds to a plurality of intra-slot transport blocks (TBs).

20. A method of wireless communication at a first wireless device, comprising:
communicating with a base station based on a configuration in which one or more reception slots follow a transmission period or a gap period;
transmitting, to the base station, a recommendation for a phase tracking reference signal (PT-RS) configuration for the one or more reception slots that follow the transmission period or the gap period, wherein the recommendation indicates a PT-RS slot offset;
receiving, following transmission of the recommendation to the base station, the PT-RS configuration that is different from a reference signal (RS) configuration of at least one additional reception slot; and receiving, from the base station, communication in the one or more reception slots following the transmission period or the gap period based on the PT-RS configuration.

21. The method of claim 20, wherein RS reception is enabled for the one or more reception slots following the transmission period or the gap period, and the RS reception is disabled for the at least one additional reception slot.

22. The method of claim 20, wherein the RS configuration includes a period between symbols in which a RS is enabled.

23. The method of claim 20, wherein the one or more reception slots following the transmission period or the gap period includes the PT-RS having a first density, and the at least one additional reception slot includes an RS having a second density, and wherein the first density is higher than the second density.

24. The method of claim 20, wherein the recommendation indicates one or more of:
   a time domain density for a PT-RS,
   a frequency domain density for the PT-RS,
   a time period between consecutive transmissions of the PT-RS, or
   an index associated with a PT-RS pattern configured through radio resource control (RRC).

25. The method of claim 20, further comprising receiving one or more conditions to trigger a change in an RS density in the one or more reception slots following the transmission period or the gap period, the one or more conditions being based on at least one of a frequency range, a frequency band, a subcarrier spacing, a modulation and coding scheme (MCS), a frequency domain resource block (RB), or a time domain symbol allocation.

26. The method of claim 20, wherein the communication received in the one or more reception slots corresponds to a plurality of intra-slot transport blocks (TBs).

27. A method of wireless communication at a-base station, comprising:
   communicating with a user equipment (UE) based on a configuration in which one or more transmission slots follow a reception period or a gap period;
   receiving, from the UE, a recommendation for a phase tracking reference signal (PT-RS) configuration for the one or more transmission slots that follow the reception period or the gap period, wherein the recommendation indicates a PT-RS slot offset;
   transmitting, following reception of the recommendation from the UE, the PT-RS configuration that is different from a reference signal (RS) configuration of at least one additional transmission slot; and
   transmitting, to the UE, communication in the one or more transmission slots following the reception period or the gap period based on the PT-RS configuration.

28. The method of claim 27, wherein RS transmission is enabled for the one or more transmission slots following the reception period of time or the gap period, and the RS transmission is disabled for the at least one additional transmission slot.

29. The method of claim 27, wherein the communication transmitted in the one or more transmission slots corresponds to a plurality of intra-slot transport blocks (TBs).

* * * * *